United States Patent
Shanks

(10) Patent No.: US 9,008,354 B2
(45) Date of Patent: Apr. 14, 2015

(54) VIDEO CAMERA TRACKING SYSTEM BASED ON GEOPOSITION DATA FEEDBACK

(75) Inventor: David Eric Shanks, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1592 days.

(21) Appl. No.: 12/026,735

(22) Filed: Feb. 6, 2008

(65) Prior Publication Data

US 2008/0187176 A1 Aug. 7, 2008

Related U.S. Application Data

(60) Provisional application No. 60/888,696, filed on Feb. 7, 2007.

(51) Int. Cl.
- G06K 9/00 (2006.01)
- G01S 3/786 (2006.01)
- G01S 3/781 (2006.01)

(52) U.S. Cl.
CPC .............. *G01S 3/7864* (2013.01); *G01S 3/781* (2013.01)

(58) Field of Classification Search
USPC ......................................................... 382/103
See application file for complete search history.

(56) References Cited

U.S. PATENT DOCUMENTS

| | | | | |
|---|---|---|---|---|
| 5,581,638 A | * | 12/1996 | Givens et al. | 382/294 |
| 6,535,816 B1 | * | 3/2003 | Smith | 701/470 |
| 6,867,799 B2 | * | 3/2005 | Broemmelsiek | 348/169 |
| 2002/0049521 A1 | * | 4/2002 | Ruffner | 701/23 |
| 2002/0171670 A1 | * | 11/2002 | Clernock et al. | 345/629 |
| 2006/0262962 A1 | * | 11/2006 | Hull et al. | 382/103 |
| 2007/0015586 A1 | * | 1/2007 | Huston | 463/42 |
| 2009/0028385 A1 | * | 1/2009 | Cavallaro et al. | 382/103 |
| 2009/0028440 A1 | * | 1/2009 | Elangovan et al. | 382/216 |

OTHER PUBLICATIONS

Liebe, Carl Christian et al.; "VIGIL—A GPS Based Target-tracking System"; Proc. SPIE 3365, Acquisition, Tracking, and Pointing XII, 10; Jul. 30, 1998; DOI: 10.1117/12.317509; 12 pages.

Han, K. et al.; "Instataneous Geo-Location of Multiple Targets From Monocular Airborne Video"; Jan. 2009; DOI: 10.1109/IGARSS.2009.5417549; Proceedings of IEEE International Geoscience & Remote Sensing Symposium; IGARSS 2009; Jul. 12-17, 2009; University of Cape Town; Cape Town, South Africa; pp. 1-2.

\* cited by examiner

*Primary Examiner* — Alex Liew

(57) ABSTRACT

The present invention discloses systems for tracking objects. A system in accordance with the present invention comprises a positioning mechanism, a camera, coupled to the positioning mechanism, a controller, coupled to the positioning mechanism, and a position sensor, coupled to the controller, wherein the position sensor sends data related to a geolocation of the position sensor to the controller, and the controller moves the positioning mechanism based on the data related to the geolocation of the position sensor.

19 Claims, 6 Drawing Sheets

VIDEO CAMERA TRACKING SYSTEM BASED ON GEOPOSITION DATA FEEDBACK

CROSS-REFERENCE TO RELATED APPLICATIONS

This application claims the benefit under 35 U.S.C Section 119(e) of U.S. Provisional Application Ser. No. 60/888,696, filed on Feb. 7, 2007, by David E. Shanks, entitled "VIDEO CAMERA TRACKING SYSTEM BASED ON GEOPOSITION DATA FEEDBACK," which application is incorporated by reference herein.

BACKGROUND OF THE INVENTION

1. Field of the Invention

The present invention relates generally to video systems, and in particular, to a method, apparatus, and article of manufacture for tracking of a subject using geographical position data feedback.

2. Description of the Related Art

Video production of live events, such as sporting events, is widely used throughout many genres. Camera operators are stationed at various places around a given venue, and are given instructions from producers and directors to follow certain parts of the action. One camera follows a general plot line, e.g., the overall view of a given event, and other cameras may follow specific actors or players, based on the live unfolding of events.

Such a scenario requires camera operators to remain focused on a very specific portion of an event, or a particular actor or participant, throughout the event's duration. Events that take a long time, or events that require repetitious camera shots, place a significant burden on camera operators.

Further, there are vantage points in certain venues that can be accessed by a remote camera, but could not be accessed by a camera operator. For example, it is possible to mount a camera on a roof or on a beam of a ceiling that would provide an excellent overhead shot of an event, but such locations are not equipped to handle a camera and an operator. However, such cameras are difficult to control in real time from a remote location where the camera operator can watch what is being viewed by the camera.

It can be seen, then, that there is a need in the art for ways to assist camera operators. It can also be seen that there is a need in the art to control remote cameras in real time.

SUMMARY OF THE INVENTION

To minimize the limitations in the prior art, and to minimize other limitations that will become apparent upon reading and understanding the present specification, the present invention discloses systems for tracking objects. A system in accordance with the present invention comprises a positioning mechanism, a camera, coupled to the positioning mechanism, a controller, coupled to the positioning mechanism, and a position sensor, coupled to the controller, wherein the position sensor sends data related to a geolocation of the position sensor to the controller, and the controller moves the positioning mechanism based on the data related to the geolocation of the position sensor.

Such a system further optionally comprises a position sensor being a satellite positioning system (SATPS) receiver, a field of view of the camera being changed based on the geolocation of the position sensor, the camera tracking the position sensor, a television delivery system coupled to an output of the camera, the television delivery system comprises a satellite television delivery system, and a plurality of cameras and a plurality of positioning mechanisms, each camera in the plurality of cameras coupled to a positioning mechanism in the plurality of positioning mechanisms in a respective fashion, and a plurality of position sensors, wherein each camera tracks a unique position sensor out of the plurality of position sensors.

A tracker for tracking an object in accordance with the present invention comprises a positioning mechanism and a controller, coupled to the positioning mechanism, wherein the controller receives geolocation data from a position sensor, the controller moving the positioning mechanism to track the objece based on the geolocation of the position sensor.

Such a tracker further optionally comprises the position sensor being a satellite positioning system (SATPS) receiver, a video camera, a field of view of the video camera being changed based on the geolocation of the position sensor, a television delivery system coupled to an output of the video camera, and the television delivery system comprising a satellite television delivery system.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Satellite Positioning System

Figure 1:
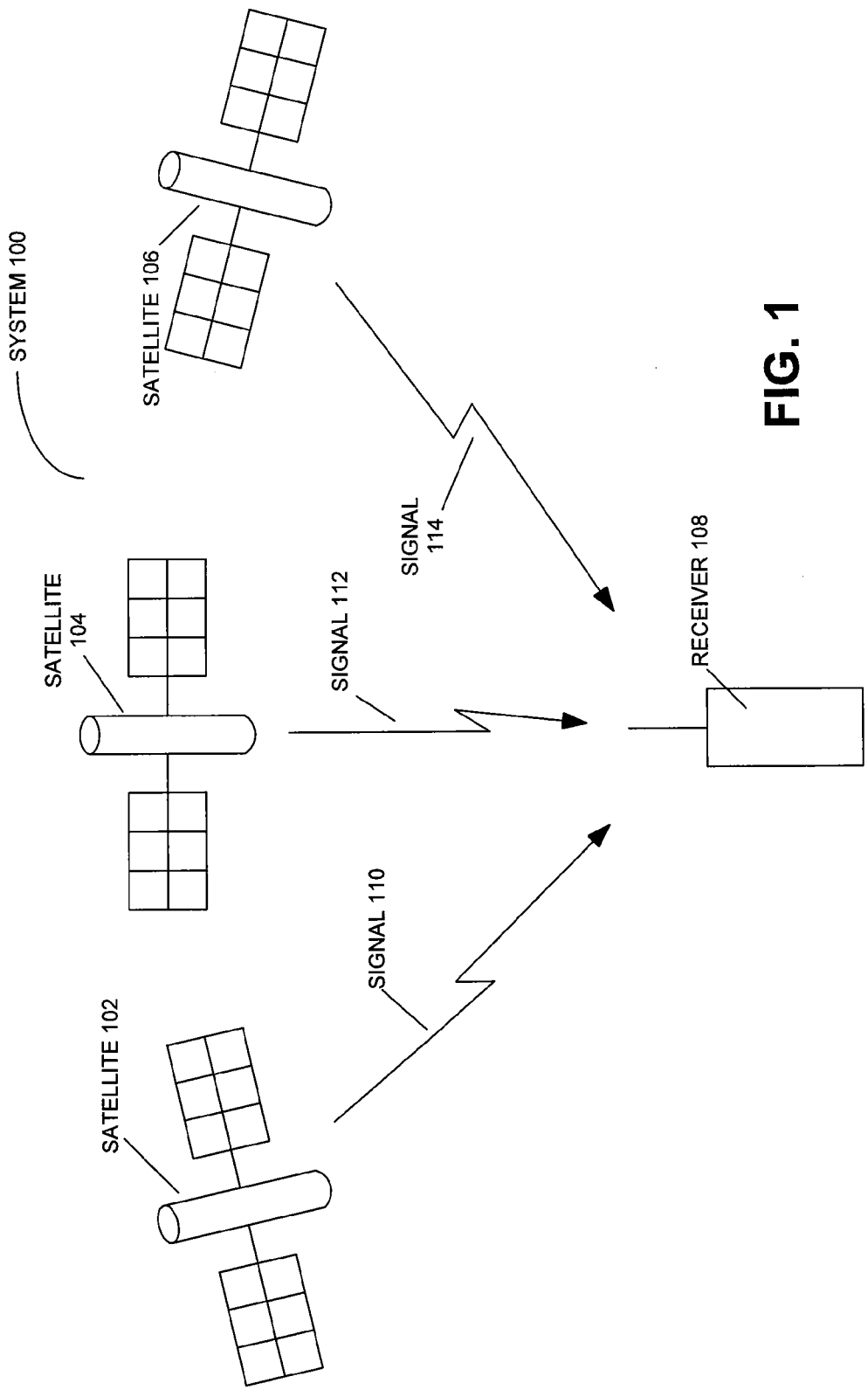
FIG. 1 illustrates a typical satellite positioning system, used in conjunction with the present invention.

FIG. 1 illustrates a conventional Satellite Positioning System (SATPS) system 100, which comprises satellites 102, 104, and 106, a SATPS receiver 108 (referred to herein as receiver 108) for receiving signals 110, 112, and 114 from SATPS satellites 102, 104, 106, respectively. Typically, such systems are also referred to as Global Positioning Systems (GPS Systems), but can be other systems, such as Assisted GPS, GLONASS, Time Differential Of Arrival (TDOA), hybridizations of these systems, and other positioning systems, without departing from the scope of the present invention.

Satellites 102, 104, 106 typically transmit spread-spectrum signals 112, 114, 116 respectively, that are received by receiver 108. As used herein, spread spectrum signals refer to a form of wireless communications in which the frequency of the transmitted signal is deliberately varied to result in a much greater bandwidth than the signal would have if it were not varied.

Receiver 108 processes these spread-spectrum signals 112, 114, 116. Depending on the application, the receiver 108 can, for example, determine the location of receiver 108. Such a location is known as the "geoposition" or "geolocation" of receiver 108. The location is typically determined by determining the distance from receiver 108 to each of the satellites 102-106 which are at known locations at a given time, and then, using a common time base, determining the location of the receiver 108 at a given time. Typical SATPS systems 100 in accordance with FIG. 1 are described in further detail in U.S. Pat. No. 4,445,118, issued to Taylor et al., that is incorporated by reference herein.

Receiver 108 can send the geolocation, or, if desired, send the computed raw distances (also known as pseudoranges) between receiver 108 and each of the satellites 102-106, to a separate computer for further processing and/or use of the geolocation information.

Positional Feedback

Figure 2:
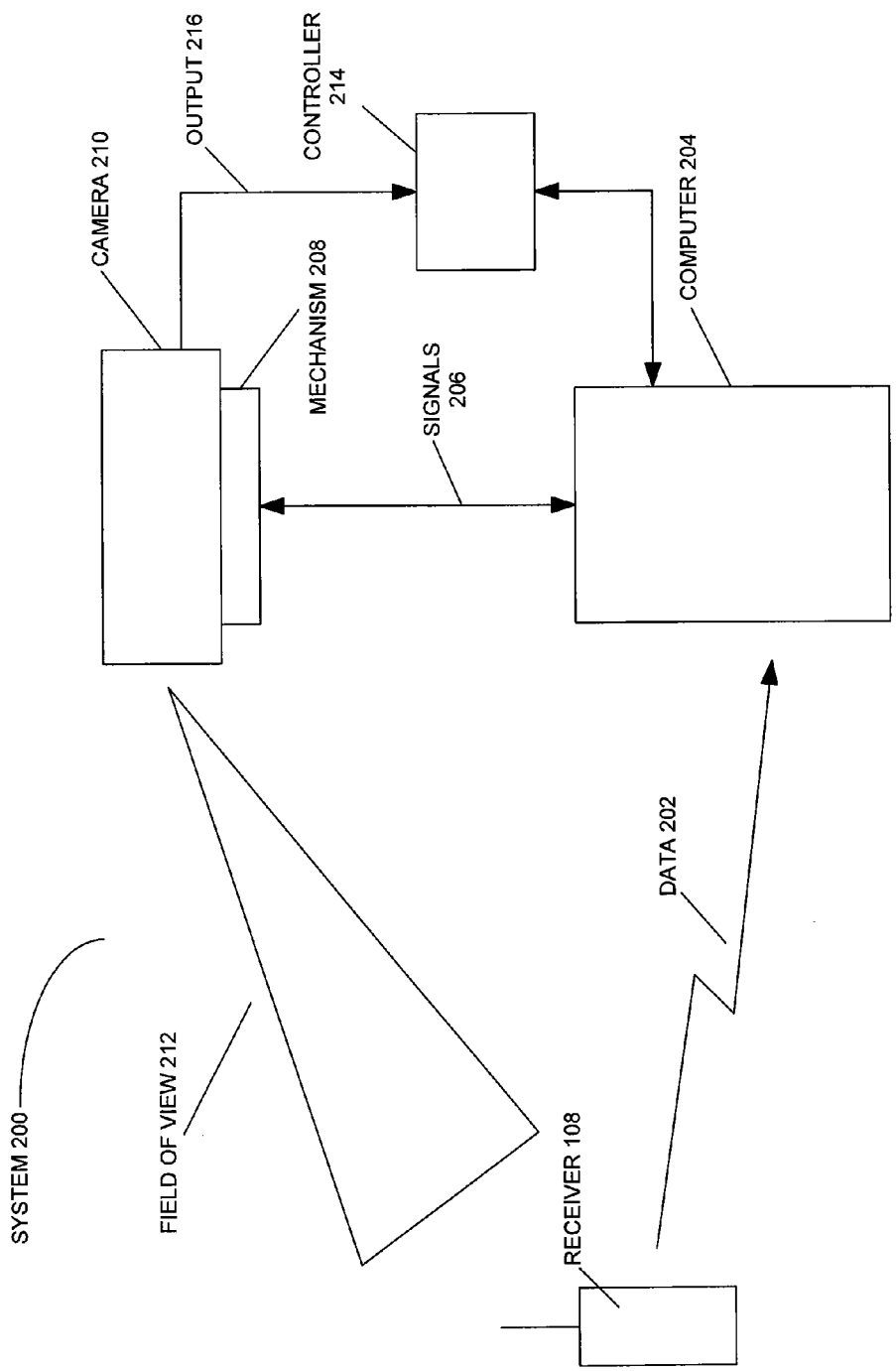
FIG. 2 illustrates a typical video camera feedback system in accordance with the present invention.

FIG. 2 describes a computer system and video camera used in conjunction with the SATPS system of FIG. 1.

System 200 shows receiver 108 sending data 202 to computer 204. Computer 204 may further process the data 202, which can comprise the geoposition of receiver 108, or the raw pseudoranges and/or other positioning data generated or measured by receiver 108. Computer 204 then sends signals 206 to positioning mechanism 208, which is coupled to camera 210. Camera 210 has field of view 212, which moves based on the direction that camera 210 is pointed.

As receiver 108 sends different geopositional data 202 to computer 204, computer 204 sends different "pointing" directions, i.e., data 206, to positioning mechanism 208, such that positioning mechanism 208 moves to follow or track receiver 108.

For example, and not by way of limitation, race cars have GPS receivers located in the car, and send geopositional data to broadcasters and other media sources for statistical and other purposes. The geopositional data, e.g., the longitude, latitude, and elevation, is sent as data 202 to a production facility, which has computer 204.

The production facility can then use computer 204 to send data 206 to a remote positioning mechanism 208, and receive data 206 back from positioning mechanism 208, with camera 210 attached, such that camera 210 can follow a given race car throughout the race. Camera 210, which can be placed on the top of a pole, or on a scoreboard or other display that is large enough for a camera 210, but too small for a camera operator, is now able to follow a given race car around the track at all times. Such an unobstructed viewpoint can be of interest to viewers of programming based on such camera 210 angles.

The system 200 of the present invention can also be used in conjunction with human intervention, e.g., in conjunction with a camera operator. The camera operator can be stationed remotely from camera 210, e.g., with computer 204, and can use computer controls or other controllers 214, including such items as a joystick or mouse, or the output 216 from camera 210, to focus camera 210, move the field of view 212 of camera 210 to another location, track a different receiver 108, offset the field of view 212 from receiver 108, etc.

Positioning Mechanism

Figure 3:
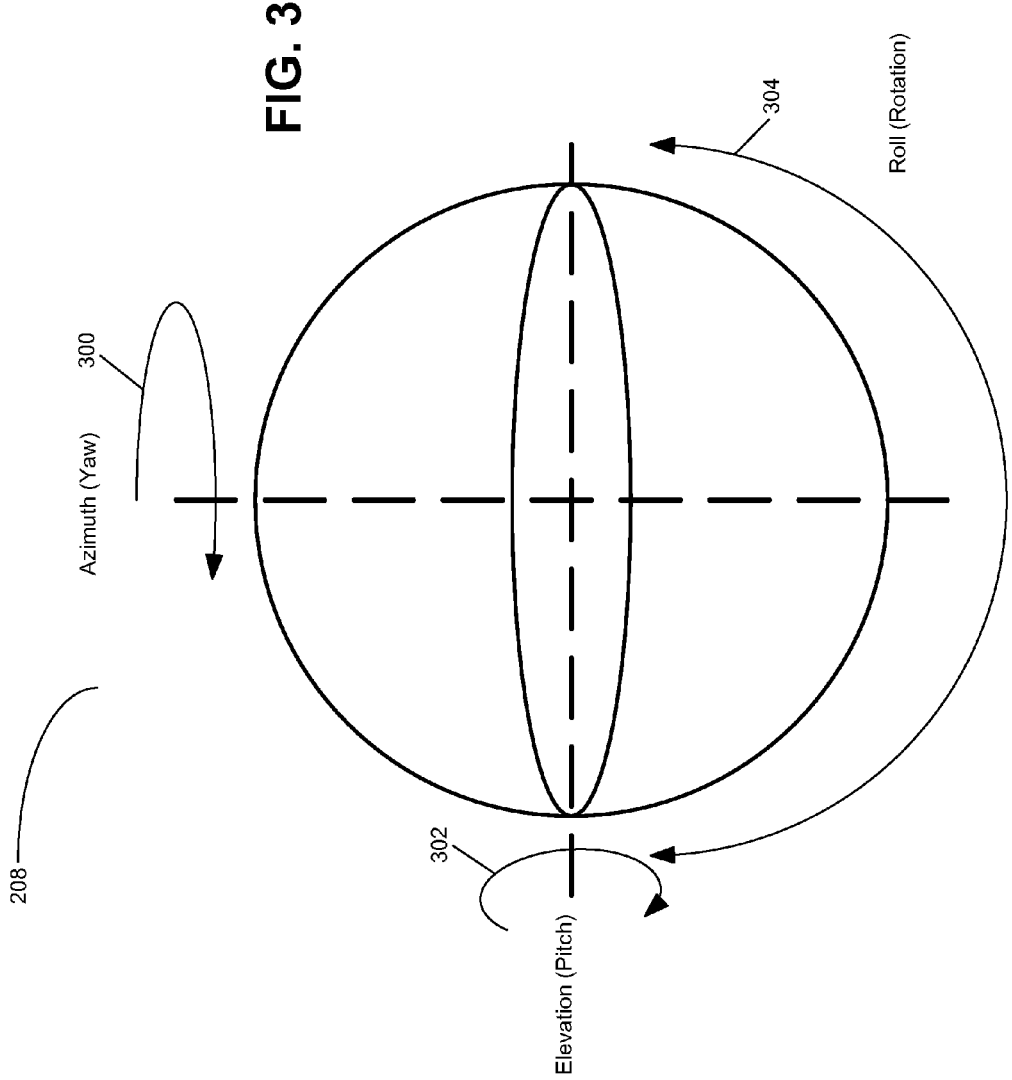
FIG. 3 illustrates the principles of a possible positioning mechanism in accordance with the present invention.

FIG. 3 illustrates the principles of a possible positioning mechanism in accordance with the present invention.

Positioning mechanism 208 can be a typical gimbal mechanism, with adjustments in azimuth (also known as yaw) 300, elevation (also known as pitch) 302, and roll (also known as rotation) 304. The roll 304 may not be required in system 200, but can be used if desired.

If camera 210 is mounted with the lens pointing into the page in the perspective of FIG. 3, data 206 that is sent back and forth from computer 204 and positioning mechanism 208 can properly align camera 210 such that the field of view 212 of camera 210 can track receiver 108. For example, longitude and latitude information from receiver 108 can be converted by computer 204 to properly adjust positioning mechanism 208 in azimuth 300, elevation 302, and roll 304 (if needed), either by sending commands to positioning mechanism 208, by comparing the geoposition of positioning mechanism 208 with that of receiver 108 and providing offset computations to manipulate positioning mechanism 208, or otherwise controlling positioning mechanism 208 to track receiver 108.

System 200 can also have human camera operators provide additional inputs to positioning mechanism 208, or to camera 210, e.g., a person can use controller 214, which is using the video from the camera 210, to adjust the camera 210 position via changes to the positioning mechanism 208.

For example, receiver 108 sends geopositional (e.g., GPS) data to controller 204. Controller 204 can be pre-programmed with the geoposition of camera 210, and use the difference in geoposition between camera 210 and receiver 108 to determine which direction to point camera 210 such that camera 210 is pointing field of view 212 approximately at receiver 108. Further, controller 208 can then correlate specific pieces of data from receiver 108 to the data being sent to positioning mechanism 208, and create a database such that positioning mechanism 208 can more readily access data from controller 204, or, if desired, other positioning mechanisms 208 or a human operator can use the database to assist in calibration of other positioning mechanisms 208.

Another possible method for controller 204 to control camera 210 is to calibrate camera 210 by interpolation or extrapolation. For example, controller 204 can use receiver 108 at several points along a given pathway, and point camera 210 at those points. Controller 204 can then record the data from positioning mechanism 208, and use the data from positioning mechanism 208 to interpolate between those several known points, such that any given receiver 108 can be tracked between the known points. So, when a given receiver is at the first measured point along the pathway, e.g., a race track, the controller knows that the positioning mechanism should be given specific data points such that camera 210 will be pointing at that first measured point. Further, as a receiver 108 moves between the known points, controller 204 will have calculated an average pathway for that receiver 108, and feed data to positioning mechanism 208 such that it will continually point camera 210 at receiver 108. Feedback from receiver 108, with possible human intervention via controller 214, to correct the positioning of camera 210.

In conjunction with these methods, controller 204 can further control camera 210 by using additional data from receiver 108, or other sources, to assist positioning mechanism 208. So, for example, if receiver 108 is in a race car, the speed of the race car can be used to control positioning mechanism 208, because positioning mechanism 208 will then have some advanced knowledge of where receiver 108 will be going, and in what direction. Controller 204 can use predictive geometry by incorporating the additional information with the receiver 108 geoposition to determine the motion of camera 210, and thus the data that controller 204 needs to send to positioning mechanism 208. Further, some data from receiver 108 can be discarded or ignored by positioning mechanism, and the transfer speed of data link 202 between receiver 108 and controller 204 can be increased. For example, if the expected path of receiver 108 is over fairly flat terrain, the altitude component of a geoposition of receiver 108 is not necessarily needed by positioning mechanism 208, and thus not needed by controller 204. As such, data link 202 can be programmed such that altitude information from receiver 108 is not sent, and thus other data can be sent on data link 202 instead, or the throughput of data link 202 can be increased.

Figure 4:
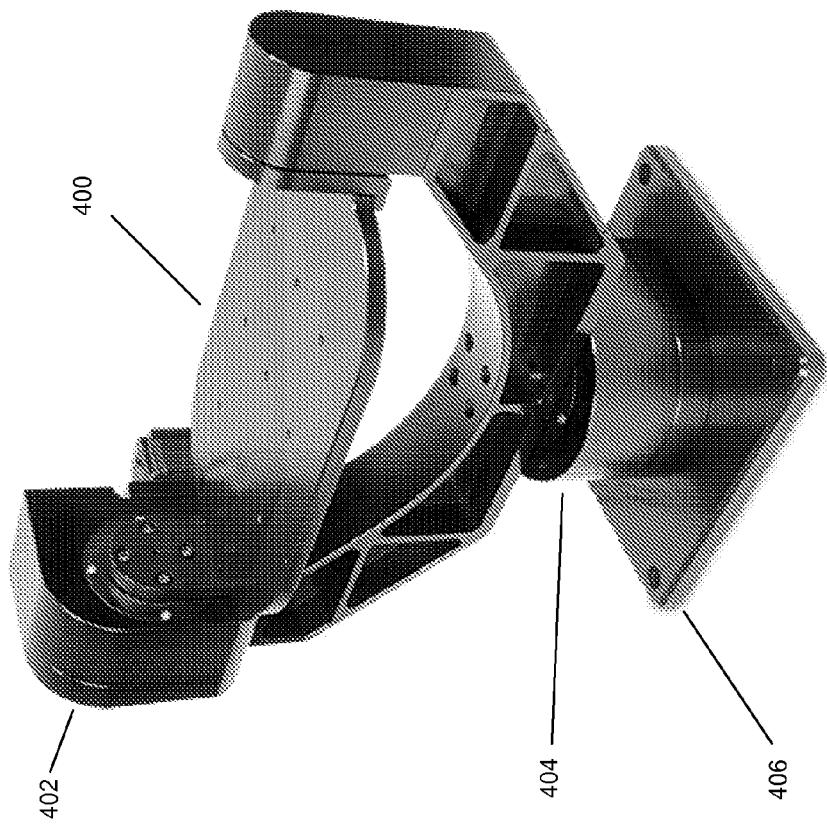
FIG. 4 illustrates a typical positioning mechanism that can be used in conjunction with the present invention.

FIG. 4 illustrates a typical positioning mechanism that can be used in conjunction with the present invention.

Positioning mechanism 208, as shown in FIG. 4, is a Newmark Systems Model GM-12 gimbal mount. The positioning mechanism 208 shown in FIG. 4 is a two-axis positioning mechanism; three axis-positioning mechanisms can also be used within the scope of the present invention. Platform 400 provides a mounting location for camera 210, and a motor is located in housing 402 to control the elevation 302 of camera 210. A motor is also housed in housing 404, which controls the azimuth 300 of camera 210. The motors located in housings 402 and 404 can be stepper motors, or other types of motors, and are controlled by controller 204 to move camera 210 (via platform 400) to specific locations based on the position of receiver 108. The positioning mechanism can then be mounted to a wall or other spot of particular advantage via mounting bracket 406. Other positioning mechanisms can be used without departing from the scope of the present invention.

Figure 5:
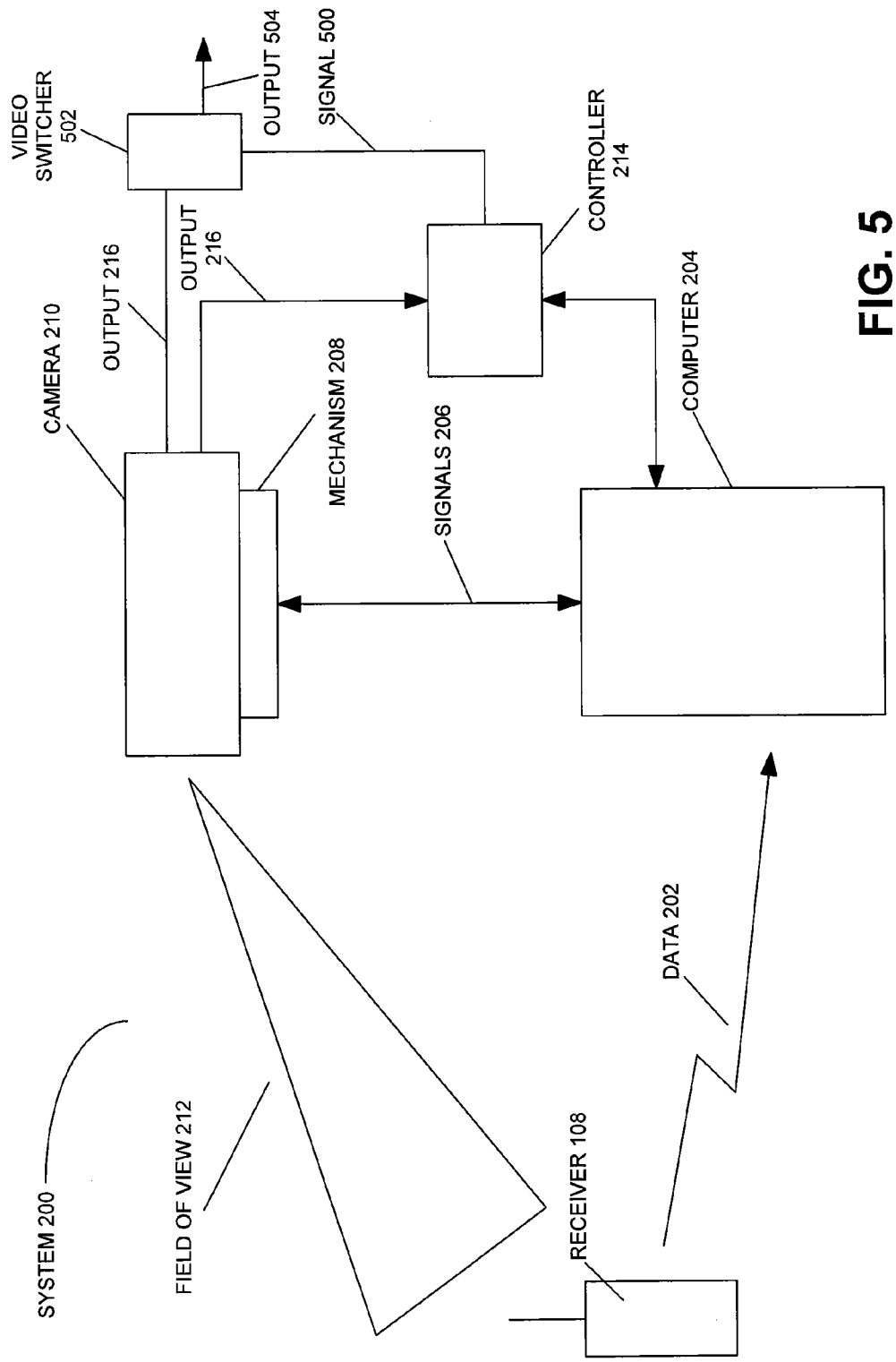
FIG. 5 illustrates a portion of a video delivery system in accordance with the present invention.

FIG. 5 illustrates a portion of a video delivery system in accordance with the present invention.

Signals 500 and 216, which come from controller 214 and camera 210 respectively, are input into video switcher 502, and an output 504 emanates from video switcher 502. Video switcher 502 can accept other inputs from other cameras 210, other controllers 214, and other sources without departing from the scope of the present invention. Video switcher 502 then delivers an output 504 which can be recorded, delivered in real-time or delayed real-time, for viewing on a monitor.

Figure 6:
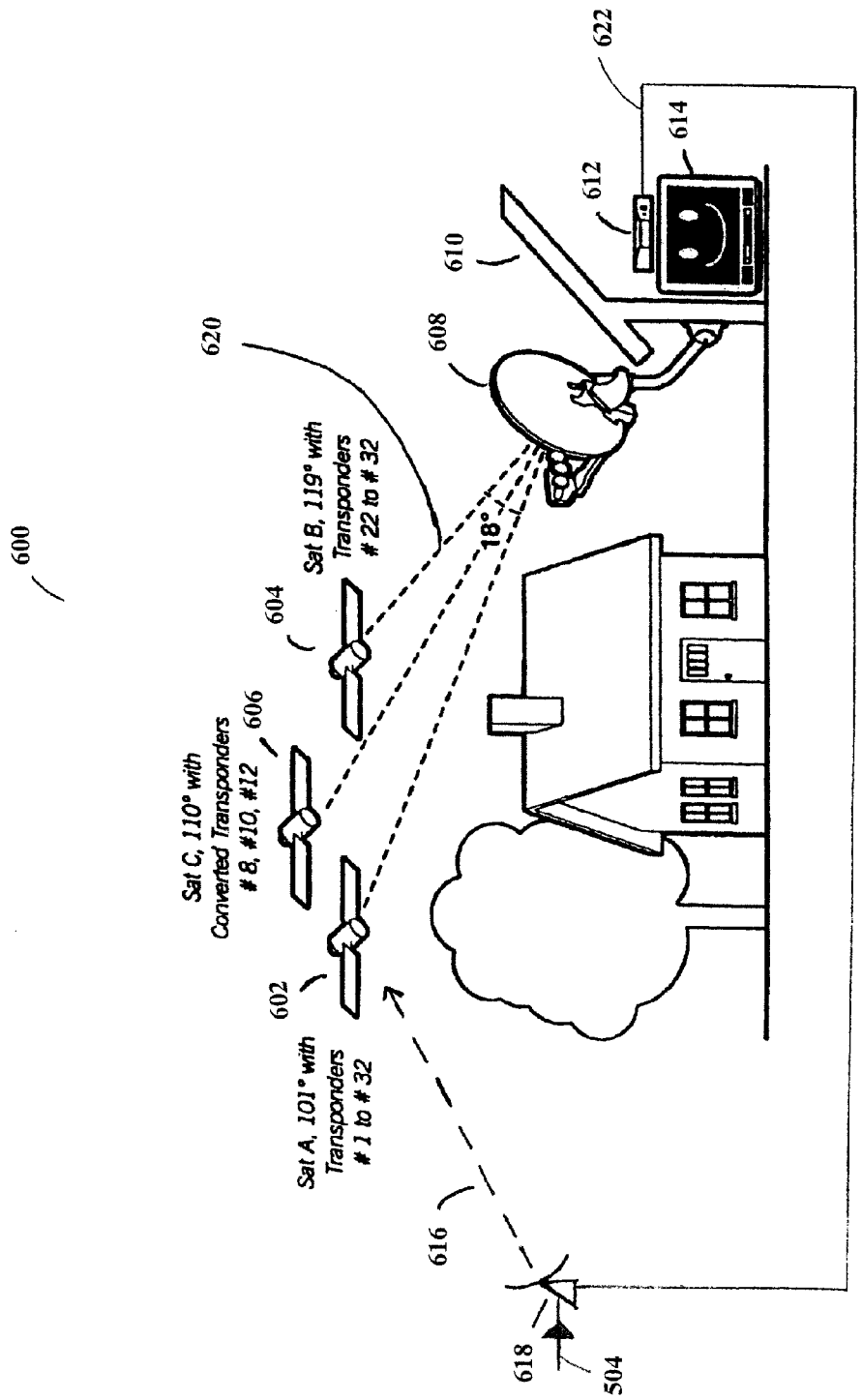
FIG. 6 illustrates a typical satellite television delivery system that can be used in conjunction with the present invention.

FIG. 6 illustrates a typical satellite television delivery system that can be used in conjunction with the present invention.

System 600 uses signals sent from Satellite A (SatA) 602, Satellite B (SatB) 604, and Satellite C (SatC) 606 that are directly broadcast to an Outdoor Unit (ODU) 608 that is typically attached to the outside of a house 610. ODU 608 receives these signals and sends the received signals to IRD 612, which decodes the signals and separates the signals into viewer channels, which are then passed to monitor 614 for viewing by a user. There can be more than one satellite transmitting from each orbital location and additional orbital locations without departing from the scope of the present invention.

Satellite uplink signals 616 are transmitted by one or more uplink facilities 618 to the satellites 602-606 that are typically in geosynchronous orbit. Satellites 602-606 amplify and rebroadcast the uplink signals 616, through transponders located on the satellite, as downlink signals 620. Depending on the satellite 602-606 antenna pattern, the downlink signals 620 are directed towards geographic areas for reception by the ODU 608.

Alternatively, uplink facilities 618 can send signals via cable 622 either in conjunction with uplink signals 616 or instead of uplink signals 616 to IRD 612, for display on monitor 614.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

Video switcher 502 delivers signals 504, either via hardline or via RF link, to uplink facility 618, where signals 504 are processed and/or encoded for delivery via uplink 616 to satellites 602-606, and, then delivered via downlink 620 to ODU 608 and to IRD 612. Video signals 504 are then processed by IRD 612 and displayed on monitor 614.

As such, a video signal 504 can be delivered via the present invention to a monitor 614 that displays a video signal 216 generated by camera 210 that is controlled by the position of receiver 108. Further, such a video signal 504 is focused on receiver 108, or, in essence, the device that receiver 108 is located in or on.

Such a video signal 504 can track, for example, a race car, a person in a sporting contest, or any person or thing that comprises receiver 108. Since receiver 108 can be made in a very small package, virtually anything can comprise receiver 108, and thus be tracked by system 200.

Conclusion

The present invention discloses systems for tracking objects. A system in accordance with the present invention comprises a positioning mechanism, a camera, coupled to the positioning mechanism, a controller, coupled to the positioning mechanism, and a position sensor, coupled to the controller, wherein the position sensor sends data related to a geolocation of the position sensor to the controller, and the controller moves the positioning mechanism based on the data related to the geolocation of the position sensor.

Such a system further optionally comprises a position sensor being a satellite positioning system (SATPS) receiver, a field of view of the camera being changed based on the geolocation of the position sensor, the camera tracking the position sensor, a television delivery system coupled to an output of the camera, the television delivery system comprises a satellite television delivery system, and a plurality of cameras and a plurality of positioning mechanisms, each camera in the plurality of cameras coupled to a positioning mechanism in the plurality of positioning mechanisms in a respective fashion, and a plurality of position sensors, wherein each camera tracks a unique position sensor out of the plurality of position sensors.

A tracker for tracking an object in accordance with the present invention comprises a positioning mechanism and a controller, coupled to the positioning mechanism, wherein the controller receives geolocation data from a position sensor, the controller moving the positioning mechanism to track the objece based on the geolocation of the position sensor.

Such a tracker further optionally comprises the position sensor being a satellite positioning system (SATPS) receiver, a video camera, a field of view of the video camera being changed based on the geolocation of the position sensor, a television delivery system coupled to an output of the video camera, and the television delivery system comprising a satellite television delivery system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents of the claims appended hereto.

What is claimed is:

1. A system for tracking an object moving along a pathway, comprising:
   a positioning mechanism;
   a camera, mechanically coupled to the positioning mechanism;
   a position sensor, coupled to the object, for generating geolocation data describing a geolocation of the position sensor;
   a transmitter, for wirelessly transmitting at least a portion of the generated geolocation data; and
   a controller, communicatively coupled to the positioning mechanism and located at a geolocation other than the object, the controller for controlling the positioning mechanism based on the at least a portion of the generated geolocation data such that a field of view of the camera moves according to the geolocation of the position sensor;
   wherein the controller controls the positioning mechanism to direct the field of view of the camera to a plurality of known points along the pathway according to the at least a portion of the generated geolocation data.

2. The system of claim 1, wherein the position sensor is a satellite positioning system (SATPS) receiver.

3. The system of claim 1, further comprising a television delivery system coupled to an output of the camera.

4. The system of claim 3, wherein the television delivery system comprises a satellite television delivery system.

5. The system of claim 1, wherein the system comprises a plurality of cameras and a plurality of positioning mechanisms, each camera in the plurality of cameras mechanically coupled to a positioning mechanism in the plurality of positioning mechanisms in a respective fashion, and a plurality of position sensors, wherein each camera tracks a unique position sensor out of the plurality of position sensors.

6. A method for tracking an object moving along a predetermined circumscribed pathway, comprising:
   wirelessly receiving, in a controller geolocation data generated by a position sensor coupled to the object, the geolocation data describing the geolocation of the position sensor;
   controlling a positioning mechanism located at a geolocation other than the object and communicatively coupled to the positioning mechanism to direct a field of view of a camera mechanically coupled to the positioning mechanism to move according to the geolocation of the position sensor and direct the field of view of the camera to a plurality of known points along the predetermined circumscribed pathway according to the at least a portion of the received geolocation data.

7. The method of claim 6, wherein the position sensor is a satellite positioning system (SATPS) receiver.

8. The method of claim 6, wherein a television delivery system is coupled to an output of the camera.

9. The method of claim 8, wherein the television delivery system comprises a satellite television delivery system.

10. The system of claim 1, wherein the controller receives position mechanism data associated with the plurality of known points along the pathway and controls the positioning mechanism to direct the field of view of the camera to the known points along the pathway according to the received position mechanism data.

11. The system of claim 10, wherein the controller controls the positioning mechanism to direct the field of view of the camera to the plurality of known points along the pathway and to direct the field of view of the camera by interpolating between the plurality of known points according to the at least a portion of the generated geolocation data.

12. The system of claim 1, wherein the geolocation data comprises data describing an elevation of the position sensor and the transmitted geolocation data excludes the data describing the elevation of the position sensor.

13. The system of claim 12, wherein:
   the transmitter wirelessly transmits the at least a portion of the generated geolocation data via a data link; and
   the data link transmits other data substituted for the excluded data describing the elevation of the position sensor.

14. The system of claim 1, wherein the pathway follows a racetrack.

15. The method of claim 6, further comprising the step of receiving position mechanism data associated with the plurality of known points along the predetermined circumscribed pathway and the position mechanism is controlled to direct the field of view of the camera to the known points along the predetermined circumscribed pathway according to the received position mechanism data.

16. The method of claim 15, wherein the positioning mechanism is further controlled to direct the field of view of the camera by interpolating between the plurality of known points according to the at least a portion of the generated geolocation data.

17. The method of claim 6, wherein the geolocation data comprises data describing an elevation of the position sensor and the received geolocation data excludes the data describing the elevation of the position sensor.

18. The method of claim 17, wherein:
   the at least a portion of the generated geolocation data is wirelessly received via a data link;
   the data link transmits other data substituted for the excluded data describing the elevation of the position sensor.

19. The method of claim 6, wherein the predetermined circumscribed pathway follows a racetrack.

* * * * *